US008811207B2

(12) United States Patent
Iraji et al.

(10) Patent No.: US 8,811,207 B2
(45) Date of Patent: Aug. 19, 2014

(54) ALLOCATING CONTROL DATA TO USER EQUIPMENT

(75) Inventors: Sassan Iraji, Espoo (FI); Honglei Miao, Espoo (FI)

(73) Assignee: Nokia Corporation, Espoo (FI)

( * ) Notice: Subject to any disclaimer, the term of this patent is extended or adjusted under 35 U.S.C. 154(b) by 231 days.

(21) Appl. No.: 13/284,137

(22) Filed: Oct. 28, 2011

(65) Prior Publication Data
US 2013/0107816 A1 May 2, 2013

(51) Int. Cl.
*G01R 31/08* (2006.01)
*H04W 72/04* (2009.01)
*H04W 72/08* (2009.01)

(52) U.S. Cl.
CPC ........... *H04W 72/042* (2013.01); *H04W 72/08* (2013.01)
USPC ........................................ 370/252

(58) Field of Classification Search
None
See application file for complete search history.

(56) References Cited

U.S. PATENT DOCUMENTS

| | | | |
|---|---|---|---|
| 7,957,743 B2 * | 6/2011 | Moe et al. ..................... 455/439 |
| 2008/0225786 A1 * | 9/2008 | Han et al. ..................... 370/329 |
| 2011/0044391 A1 | 2/2011 | Ji et al. ........................ 375/260 |
| 2011/0170496 A1 | 7/2011 | Fong et al. ................... 370/329 |
| 2011/0286628 A1 * | 11/2011 | Goncalves et al. ........... 382/103 |
| 2012/0113827 A1 * | 5/2012 | Yamada et al. ............... 370/252 |
| 2013/0028191 A1 * | 1/2013 | Qi et al. ....................... 370/328 |
| 2013/0064119 A1 * | 3/2013 | Montojo et al. .............. 370/252 |
| 2013/0107816 A1 * | 5/2013 | Iraji et al. .................... 370/329 |

FOREIGN PATENT DOCUMENTS

| EP | 2207271 A1 | 7/2010 |
|---|---|---|
| EP | 2355604 A1 | 8/2011 |

OTHER PUBLICATIONS

Sharp: "Motivations and scenarios for enhanced downlink control channel investigation"; R1-113351, $3^{rd}$ Generation Partnership Project (3GPP), 3GPP TSG RAN WG1 Meeting #66bis; Zhuhai, China; Oct. 10-14, 2011; pp. 1-57.
3GPP TS 36.213 V10.3.0 (Sep. 2011), Technical Specification, $3^{rd}$ Generation Partnership Project; Technical Specification Group Radio Access Network; Evolved Universal Terrestrial Radio Access (E-UTRA); Physical Layer Procedures (Release 10), (122 pages).

* cited by examiner

*Primary Examiner* — Robert Wilson
(74) *Attorney, Agent, or Firm* — Harrington & Smith (57) ABSTRACT

A user equipment UE reports its UE-specific channel quality to the network. The network uses this to narrow a search space in which the UE looks for its downlink control signaling. In one embodiment the search space is defined by downlink signaling the network sends. The width of the search space may also select between types of downlink control signaling (for example, between PDCCH and E-PDCCH). In the specific examples described the poorest channel qualities result in the whole-bandwidth PDCCH being used while better channel qualities result in progressively narrower search spaces to look for an E-PDCCH.

18 Claims, 5 Drawing Sheets

Figure 1: Prior Art

| CQI index | modulation | code rate x 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Figure 2

| CQI Report | Type of Control Channel | Number of subband for search space |
|---|---|---|
| CQI1...CQI5 | PDCCH | Whole bandwidth |
| CQI6...CQI8 | E-PDCCH | 5 best subband will be allocated. |
| CQI9...CQI12 | E-PDCCH | 2 best subband will be allocated |
| CQI13...CQI15 | E-PDCCH | Only the best subband will be allocated |

ALLOCATING CONTROL DATA TO USER EQUIPMENT

TECHNICAL FIELD

The exemplary and non-limiting embodiments of this invention relate generally to wireless communication systems, methods, devices and computer programs, and more specifically relate to search spaces which the user equipment must search through in order to see if there is a downlink control channel for it.

BACKGROUND

The following abbreviations that may be found in the specification and/or the drawing figures are defined as follows:
- 3GPP third generation partnership project
- CSI channel state information
- CQI channel quality indicator
- DL downlink
- eNB/eNodeB node B/base station in an E-UTRAN system
- E-UTRAN evolved UTRAN (LTE)
- LTE long term evolution (E-UTRAN)
- LTE-A long term evolution-advanced (of E-UTRAN)
- PDCCH physical downlink control channel
- E-PDCCH enhanced physical downlink control channel
- PDSCH physical downlink shared channel
- PUSCH physical uplink shared channel
- RF radio frequency
- SINR signal to interference plus noise ratio
- UE user equipment
- UL uplink
- UTRAN universal terrestrial radio access network In conventional LTE, the network allocates uplink PUSCH and downlink PDSCH radio resources to its various UEs by means of a PDCCH. Each UE attempts to decode at least part of the PDCCH to see if the UE identifier is listed there; if yes the UE decodes further to find its resource allocation(s) and if no the UE can disregard that PDCCH. This is known as blind decoding since the UE does not know in advance whether any given PDCCH is addressed to it. Among all the UEs in a cell the PDCCHs are distributed, so that different groups of UEs look for a PDCCH addressed to them in different time intervals. This also allows the UEs to go into a sleep or low-power mode between their scheduled PDCCH time intervals, so long as they have no ongoing data processes, by a mechanism termed in the art as a discontinuous reception cycle. The PDCCHs in a cell are therefore transmitted in a distributed manner. Since the PDCCHs are distributed across the whole spectrum (or across the whole component carrier for the case of a carrier aggregation system such as LTE-A), the UE's PDCCH search space is the whole control channel region of the whole bandwidth (or of the component carrier bandwidth) for the duration of its assigned PDCCH time interval.

In the ongoing standardization of the LTE-A system there is an enhanced PDCCH (E-PDCCH) which is based on localized radio resources. The E-PDCCH has the potential to improve the efficiency of the conventional PDCCH by using beamforming and multiple-antenna techniques, though exactly how the E-PDCCH is to operate is at this time far from settled. Certain proposals envision the E-PDCCH as being time or frequency division multiplexed with resource elements (or even with OFDM symbols) within the PDSCH region of the bandwidth. Others propose a hybrid time/frequency division such as is used for the relay PDCCH R-PDCCH. See for example US Patent Application No. 20110044391 entitled "Plural Channels for Transmission of a Single Pulse Train", and US Patent Application No. 20110170496 entitled "Channel Assignment" for details as to the E-PDCCH being disposed in the data (PDSCH/PUSCH) region of the bandwidth.

Still there remain some essential unresolved issues concerning the E-PDCCH. Specifically, it is not yet determined what criteria the eNB will use to choose between using a PDCCH or an E-PDCCH for scheduling any specific UE, nor is it settled where in frequency the eNB should put the E-PDCCH if that's the chosen scheduling mechanism. Embodiments of these teachings resolve these open issues in a manner that is particularly advantageous from the UE's power-limited perspective.

SUMMARY

In a first exemplary embodiment of the invention there is an apparatus comprising at least one processor and at least one memory including computer program code. In this embodiment the at least one memory and the computer program code is configured, with the at least one processor, to cause the apparatus at least to: report to a wireless network node channel quality that is specific for a user equipment; and search for a downlink control channel directed to the user equipment within a search space which depends at least in part on the reported channel quality.

In a second exemplary embodiment of the invention there is a method comprising: reporting to a wireless network node channel quality that is specific for a user equipment; and searching for a downlink control channel directed to the user equipment within a search space which depends at least in part on the reported channel quality.

In a third exemplary embodiment of the invention there is a computer readable memory tangibly storing a computer program that is executable by at least one processor. In this embodiment the computer program comprises: code for reporting to a wireless network node channel quality that is specific for a user equipment; and code for searching for a downlink control channel directed to the user equipment within a search space which depends at least in part on the reported channel quality.

In a fourth exemplary embodiment of the invention there is an apparatus comprising at least one processor and at least one memory including computer program code. In this embodiment the at least one memory and the computer program code is configured, with the at least one processor, to cause the apparatus at least to: determine a search space at least in part from channel quality reported by a user equipment; and send to the user equipment within the determined search space a downlink control channel directed to the user equipment.

In a fifth exemplary embodiment of the invention there is a method comprising: determining a search space at least in part from channel quality reported by a user equipment; and sending to the user equipment within the determined search space a downlink control channel directed to the user equipment.

In a sixth exemplary embodiment of the invention there is a computer readable memory tangibly storing a computer program that is executable by at least one processor. In this embodiment the computer program comprises: code for determining a search space at least in part from channel quality reported by a user equipment; and code for sending to the user equipment within the determined search space a downlink control channel directed to the user equipment.

These and other aspects of the invention are detailed below with particularity.

DETAILED DESCRIPTION

In allocating resources for the E-PDCCH in LTE-A, the E-PDCCH uses a localized resource allocation based on the UE-specific CSI. Embodiments of these teachings provide a way for the eNB to decide in which frequency bands it will put the E-PDCCH control data of the specific UE, so that the UE can extract its control data. Embodiments of these teachings further aid the eNB in determining when to use the PDCCH and when to use the E-PDCCH. Embodiments of these teachings limit the search space for the E-PDCCH based on CSI reporting; the better the channel condition the smaller the search space.

Figure 3:
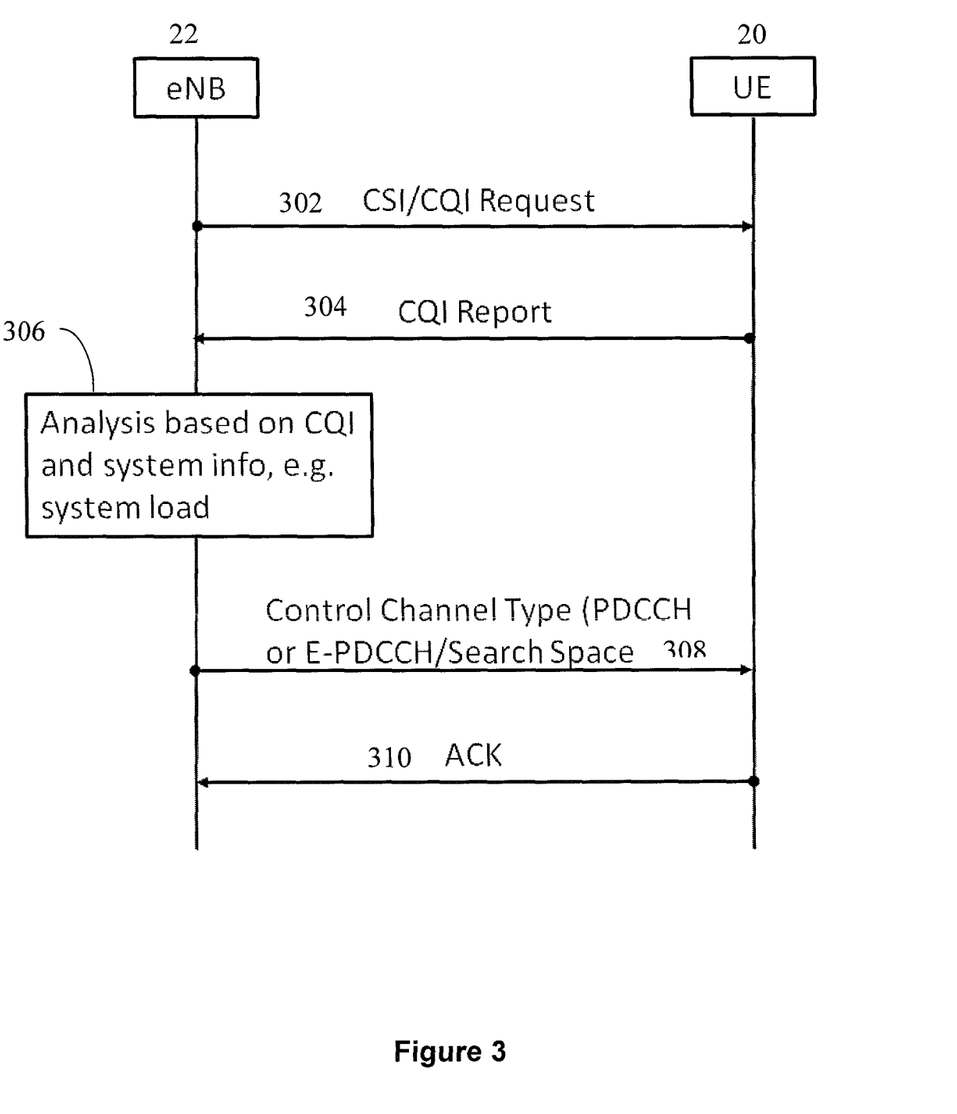
FIG. 3 is a signaling diagram for reporting CQI, analysis by the eNB to select a search space and informing that search space to the UE according to an exemplary embodiment of these teachings.

In an embodiment detailed with respect to FIG. 3 this search space is signaled by the eNB to the UE. In one implementation the eNB signals the E-PDCCH search space to UE by RRC signaling; in another implementation the eNB signals E-PDCCH search space to UE by physical layer signaling. Shrinking the search space from the whole bandwidth to the more limited search space reduces the UE's blind decoding efforts, which conserves the UE's limited battery power.

The UE sends its CQI feedback after taking into account the SINR and the characteristics of its receiver. This enables the eNB to know the maximum data rate which the channel can support. From this reported CQI the eNB will then choose a) whether to allocate to this UE A PDCCH or an E-PDCCH; and b) if an E-PDCCH, the search space in which to send it. Note that the CQI is specific for this UE; another UE nearby might see quite different channel conditions and report a different CQI value.

Figure 1:
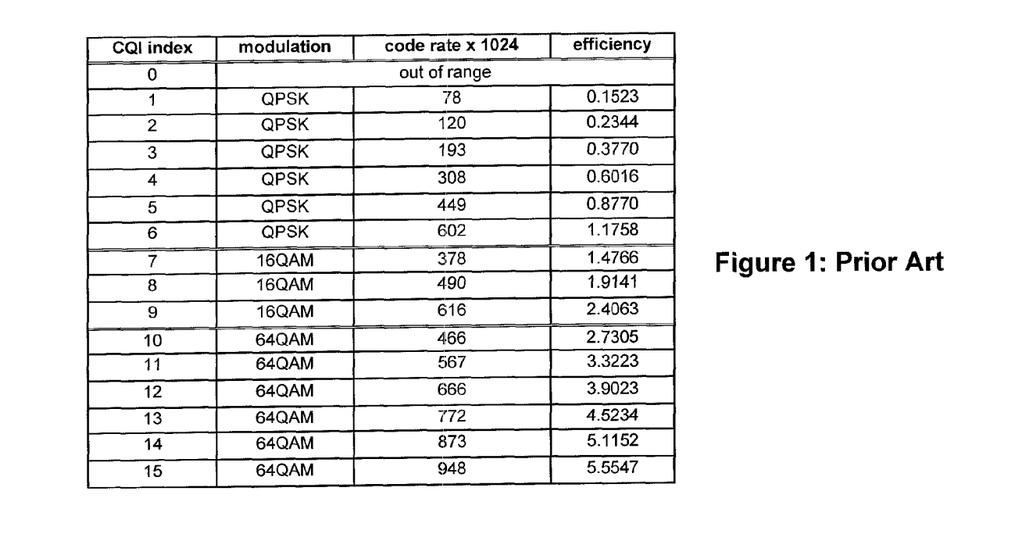
FIG. 1 is a prior art table taken from table 7.2.3-1 of 3GPP TS36.213 v10.3.0 of modulation, code rate and information bit efficiency for various CQI index values.

In conventional LTE, based on the reported CQI the eNB will select one of the available modulation schemes (QPSK, 16QAM or 64QAM) and a code rate. As seen at FIG. 1 taken from table 7.2.3-1 of 3GPP TS36.213 v10.3.0, there are 16 CQI indices from CQI-0 to CQI-15, each associated with a different combination of modulation and coding rate.

It is easily seen that as much as the CQI index increases, the search which yields different efficiencies for how many information bits per symbol can be transmitted.

As can be seen from the information bit efficiency, higher CQI index values correspond to better channel conditions. So the eNB has, from the reported CQI index which all the various UEs in the cell report, the information on channel quality in each sub-band in the whole bandwidth. Based on the reported CQI, the eNB can dynamically allocate the sub-bands in which that specific UE is to search for its control data.

Figure 2:
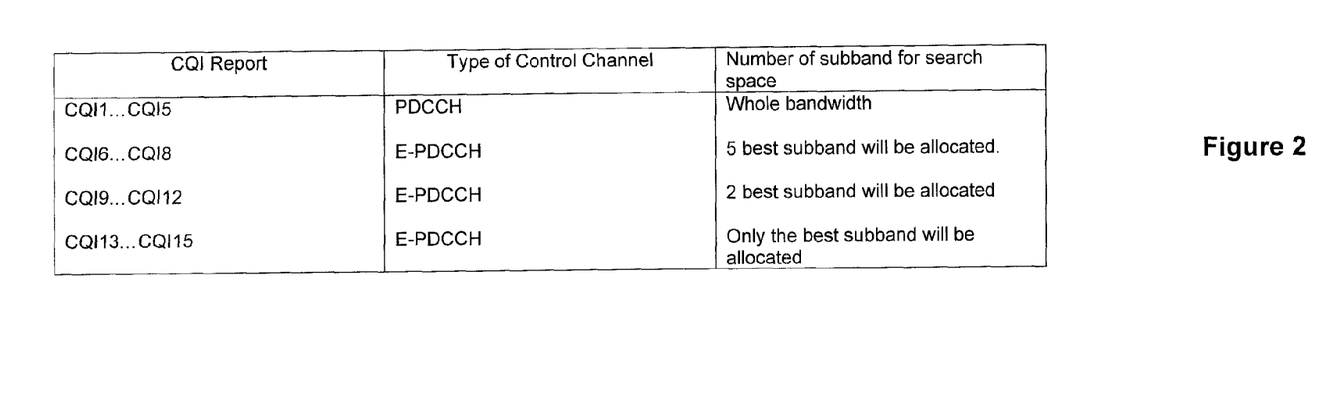
FIG. 2 is a table showing sub-band search space for various values of reported CQI indices and whether the search is to be for a PDCCH or an E-PDCCH according to an exemplary embodiment of these teachings.

Reducing that search space to less than the whole bandwidth means that the UE can reduce the amount of blind decoding it performs in order to extract its own control data. The dynamic threshold for sub-band allocation for the E-PDCCH is in exemplary embodiments of these teachings decided by the eNB based on the UE-specific CQI reports. One non-limiting example of how the eNB might use reported CQI indices to allocate the UE's search space is shown at FIG. 2. For the best channel conditions reported as CQI indices 13 through 15 the eNB will limit the search space to only one sub-band, the best quality channel which the UE reports. For reported index values of 9 through 12 the search space is a bit wider, two sub-bands but still the two highest quality bands the UE has reported. For reported CQI values between 6 and 8 the eNB will allocate an E-PDCCH within a search space spanning the five best-reported sub-bands. But for the case of poor channel conditions for this UE where it reports CQI between 1 and 5, the eNB will choose to allocate resources via a PDCCH rather than an E-PDCCH, and the search space will be the whole bandwidth as is conventional for the LTE system.

Note that the search spaces of FIG. 2 are dynamic per UE; after sending a first CQI report the UE may have an E-PDCCH search space of two sub-bands and after sending its second CQI report that UE's search space may be expanded to five sub-bands. In one embodiment the eNB might rigidly follow a table as in FIG. 2 that strictly sets search space size based on reported CQI value. In another embodiment the eNB has a bit more flexibility to account for other system characteristics such as traffic load in the whole cell and an even distribution of E-PDCCHs among various frequency sub-bands, so the eNB will use the search space widths of FIG. 2 subject to modification by other relevant factors.

In the former rigid correspondence example the UE will know the search space width in advance since the UE reported its own CQI, but it may not know which sub-bands make up that search space. In the latter example even the search space width is unknown to the UE unless that information is provided to it by the eNB, since it is the eNB which decides the search space width and the specific sub-bands for the search space based on CQI along with other system wide considerations. FIG. 3 is a signalling diagram detailing how the eNB can get this dynamic search space information to the UE so the eNB may continue to make the most optimum resource allocations for where (which sub-band) it sends the E-PDCCH to a given UE.

FIG. 3 begins with the eNB 22 sending to the UE a request 302 for its CQI report (or alternatively a request for channel state information CSI). The UE 20 then responds 304 with its CQI report that gives a CQI index per channel that grades each of the reported channels relative to thresholds which define the index values as is known in conventional LTE channel feedback reporting.

With this channel quality information the eNB 22 at processing block 306 performs an analysis to determine how wide and what sub-bands should make up the search space for the E-PDCCH for that UE 20. Note that if the reported channel quality is poor the analysis at block 306 will also determine what type of DL control channel to send to the UE 20, a PDCCH which the eNB 22 selects if the channel conditions are poor, or an E-PDCCH which the eNB selects if the channel conditions are better than those from which it would select a PDCCH. Downlink message 308 represents in one embodiment RRC signalling and in another embodiment physical layer signalling. In either case it is dynamic, and is a message indicating the control channel type (PDCCH or E-PDCCH) and the search space. For example, message 308 may indicate the search space by specifying which frequency sub-bands are included in the search space which is also an indication of the search space width. Assuming the UE 20 properly receives and decodes that message 308, it sends an acknowledgement 310 back to the eNB meaning the UE 20 will now know a narrower search space in which to blindly detect its DL control signalling (narrower for the case the eNB 22 is sending an E-PDCCH rather than a PDCCH to this UE 20).

From the eNB's perspective, the above solution works quite well if there are several users with good channel conditions, especially if the network is supporting multiuser scenarios. This is because there need not be any blocking since it is the eNB that decides which sub-bands the E-PDCCHs are to be sent rather than a rigid rule like FIG. 2 that might be used without the possibility of modification by the eNB 22. For example, when allocating sub-bands for the E-PDCCH search space the eNB 22 may take into account the UE's/user's priority, fairness to all the UEs in the cell, and so on. All of these can be accounted for by the eNB 22 at the analysis of block 306 in FIG. 3.

Various of the above embodiments of these teachings provide certain technical effects, such as for example faster signal detection and less complexity for the UE, and better quality sub-bands on which to send the E-PDCCH. These teachings also facilitate use of the E-PDCH in an efficient manner, meaning all the benefits such as spectral efficiency which comes with the E-PDCCH. These are seen to more than offset the additional dynamic signalling shown at FIG. 3 to inform the UE 20 of its search space sub-bands (and whether the DL control signalling will be an E-PDCCH or a PDCCH).

Figure 4:
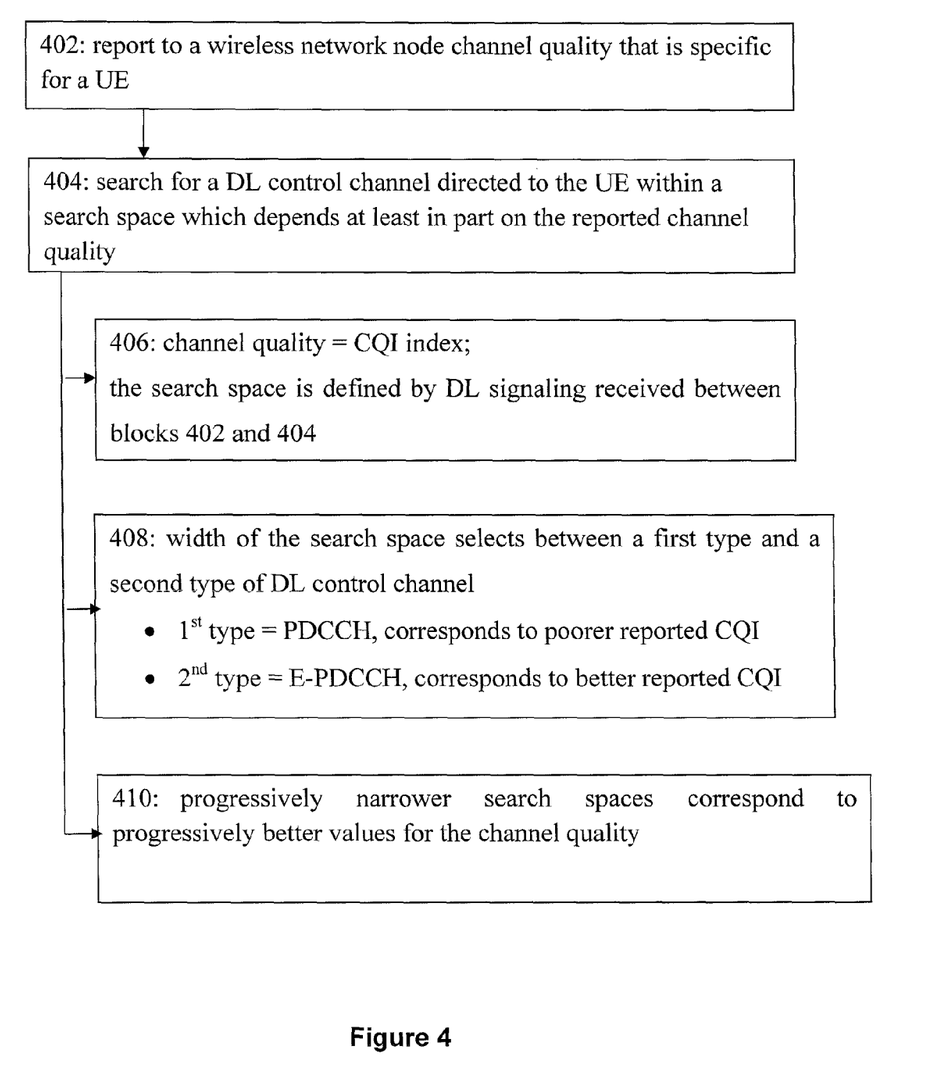
FIG. 4 is a logic flow diagram from the perspective of the user device that illustrates the operation of a method, and a result of execution by an apparatus of a set of computer program instructions embodied on a computer readable memory, in accordance with the exemplary embodiments of this invention.

FIG. 4 is a logic flow diagram which summarizes the various exemplary embodiments of the invention from the perspective of the UE (or certain components thereof if not performed by the entire UE), and may be considered to illustrate the operation of a method, and a result of execution of a computer program stored in a computer readable memory, and a specific manner in which components of an electronic device are configured to cause that electronic device to operate, whether such an electronic device is the access node in full or one or more components thereof such as a modem, chipset, or the like.

At block 402 the UE reports to a wireless network node channel quality that is specific for a UE, and at block 404 the UE searches for a downlink control channel directed to the UE within a search space which depends at least in part on the reported channel quality.

Further portions of FIG. 4 illustrate various of the above exemplary embodiments. Block 406 reflects the examples above illustrated by FIGS. 2 and 3. Specifically, the channel quality reported to the network is a CQI index (which is reported to an eNodeB of an E-UTRAN system), and the search space is defined by downlink signaling received from the eNodeB between block 402 when the channel quality is reported and block 404 when the search for the downlink control channel is initiated.

Block 408 specifies that the width of the search space selects between a first type and a second type of downlink control channel, and more specifically details that the first type is a PDCCH which corresponds to poorer reported channel quality and the second type is an E-PDCCH which corresponds to better channel quality.

And finally block 410 summarizes the characteristic of FIG. 2 in that progressively narrower search spaces correspond to progressively better values for the reported channel quality.

Figure 5:
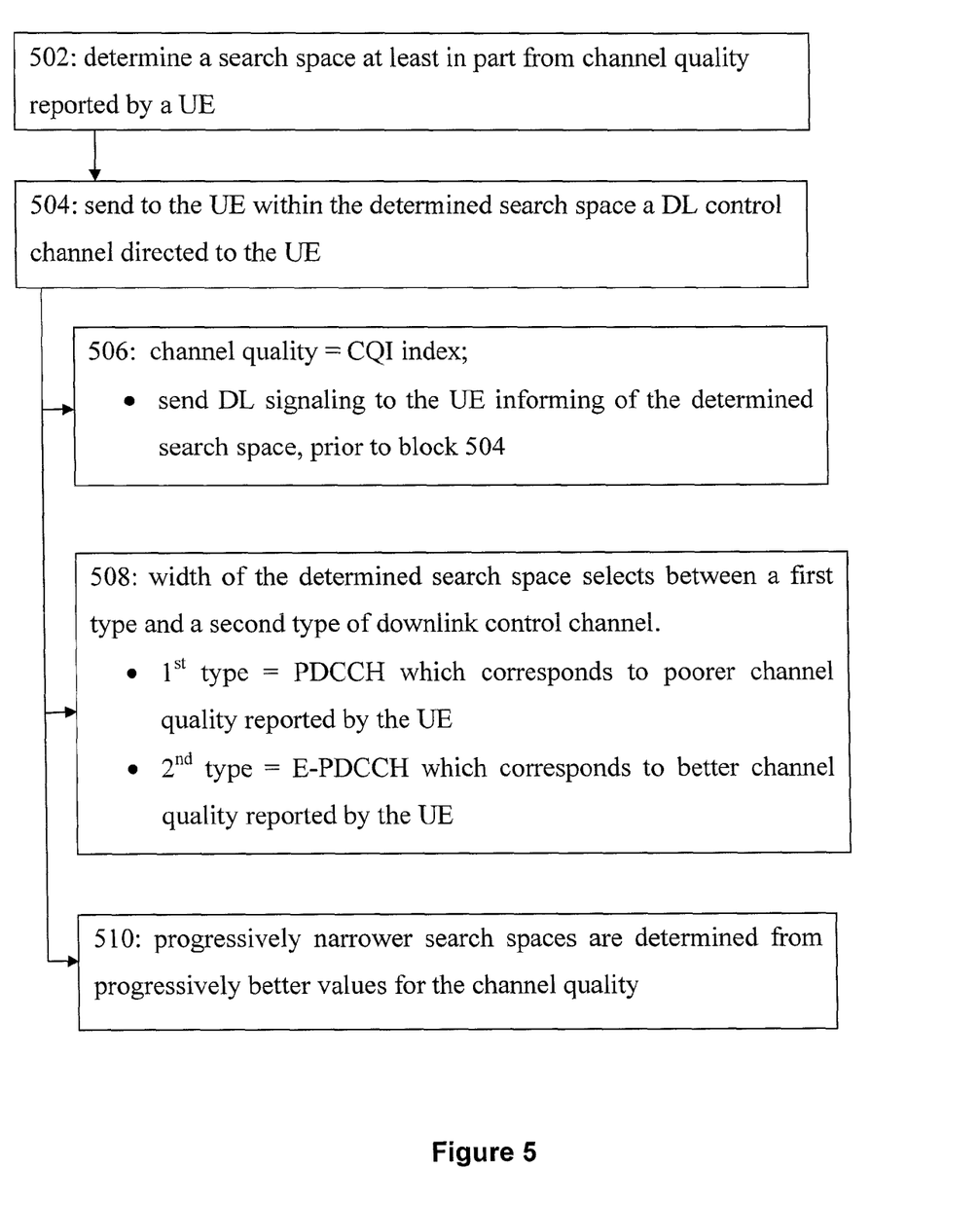
FIG. 5 is a logic flow diagram from the perspective of the network or network access node that illustrates the operation of a method, and a result of execution by an apparatus of a set of computer program instructions embodied on a computer readable memory, in accordance with the exemplary embodiments of this invention.

FIG. 5 is a logic flow diagram which summarizes the various exemplary embodiments of the invention from the perspective of the eNB (or certain components thereof if not performed by the entire eNB or other access node if different from the LTE system), and may be considered to illustrate the operation of a method, and a result of execution of a computer program stored in a computer readable memory, and a specific manner in which components of an electronic device are configured to cause that electronic device to operate, whether such an electronic device is the access node in full or one or more components thereof such as a modem, chipset, or the like.

At block 502 the eNB determines a search space at least in part from channel quality reported by a UE, and at block 504 sends to the UE within the determined search space a downlink control channel directed to that same UE.

Further portions of FIG. 5 summarize the various exemplary embodiments above. Block 506 stipulates that the channel quality comprises a channel quality index, and further the embodiment detailed with respect to FIG. 3 of the network sending downlink signaling to the UE informing the UE of the search space that the network has determined for it. This downlink signaling is of course sent, prior to sending the downlink control channel that is sent at block 504.

Block 508 is similar to block 408 of FIG. 4; the width of the determined search space selects between a first type and a second type of downlink control channel, in which the first type is a PDCCH which corresponds to poorer channel quality reported by the UE, and the second type is an E-PDCCH which corresponds to better channel quality reported by the UE.

And finally block 510 describes the characteristic of FIG. 2 that progressively narrower search spaces are determined from progressively better values for the channel quality.

The various blocks shown in each of FIGS. 4-5 may also be considered as a plurality of coupled logic circuit elements constructed to carry out the associated function(s), or specific result of strings of computer program code or instructions stored in a memory. Such blocks and the functions they represent are non-limiting examples, and may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Figure 6:
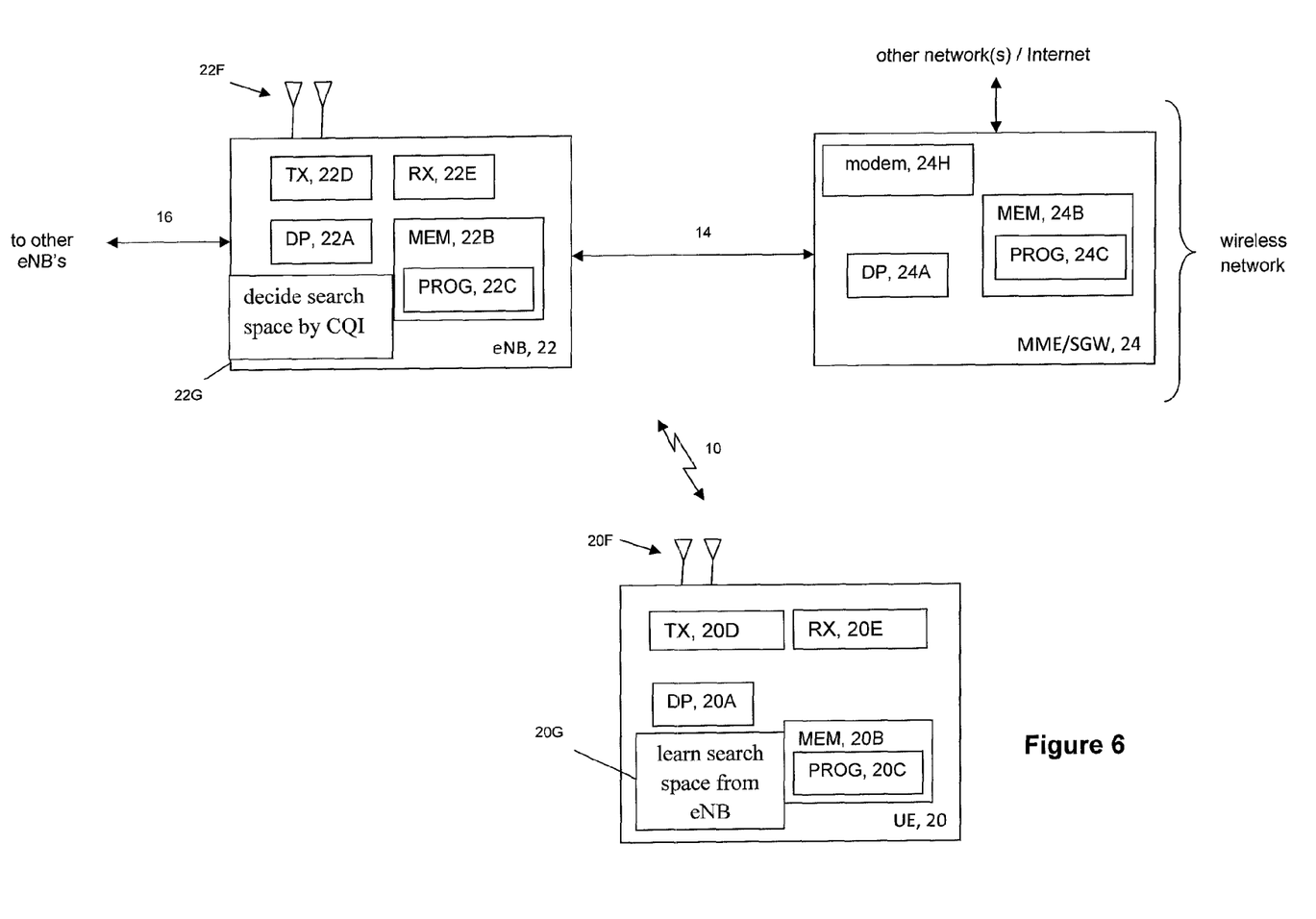
FIG. 6 is a simplified block diagram of a user equipment and an E-UTRAN eNB access node which are exemplary devices suitable for use in practicing the exemplary embodiments of the invention.

Reference is now made to FIG. 6 for illustrating a simplified block diagram of various electronic devices and apparatus that are suitable for use in practicing the exemplary embodiments of this invention. In FIG. 6 an eNB 22 is adapted for communication over a wireless link 10 with an apparatus, such as a mobile terminal or UE 20. While there are typically several UEs under control of the eNB 22, for simplicity only one UE 20 is shown at FIG. 6. The eNB 22 may be any access node (including frequency selective repeaters) of any wireless network such as LTE, LTE-A, GSM, GERAN, WCDMA, and the like. The operator network of which the eNB 22 is a part may also include a network control element such as a mobility management entity MME and/or serving gateway SGW 24 or radio network controller RNC which provides connectivity with further networks (e.g., a publicly switched telephone network and/or a data communications network/Internet).

The UE 20 includes processing means such as at least one data processor (DP) 20A, storing means such as at least one computer-readable memory (MEM) 20B storing at least one computer program (PROG) 20C or other set of executable instructions, communicating means such as an LTE transmitter TX 20D and a LTE receiver RX 20E for bidirectional wireless communications with the eNB 22 via one or more antennas 20F. Also stored in the MEM 20B at reference number 20G is the UE's algorithm for learning its search space from the eNB, such as via the table of FIG. 2 if the eNB sends that to the UE and/or from the downlink RRC or physical layer signaling shown by example at message 308 of FIG. 3.

The eNB 22 also includes processing means such as at least one data processor (DP) 22A, storing means such as at least one computer-readable memory (MEM) 22B storing at least one computer program (PROG) 22C or other set of executable instructions, and communicating means such as a transmitter TX 22D and a receiver RX 22E for bidirectional wireless communications with the UE 20 (or UEs) via one or more antennas 22F. The eNB 22 stores at block 22G the algorithm for deciding the search space in dependence on the UE-specific CQI which the eNB received, as well as other network considerations such as total traffic load as noted in the various embodiments above.

At least one of the PROGs 22C in the eNB 22 is assumed to include a set of program instructions that, when executed by the associated DP 22A, enable the device to operate in accordance with the exemplary embodiments of this invention, as detailed above. The UE 20 also stores software in its MEM 20B to implement certain aspects of these teachings. In these regards the exemplary embodiments of this invention may be implemented at least in part by computer software stored on the MEM 20B, 22B which is executable by the DP 20A of the UE 20 and/or by the DP 22A of the eNB 22, or by hardware, or by a combination of tangibly stored software and hardware (and tangibly stored firmware). Electronic devices implementing these aspects of the invention need not be the entire devices as depicted at FIG. 6 or may be one or more components of same such as the above described tangibly stored software, hardware, firmware and DP, or a system on a chip SOC or an application specific integrated circuit ASIC.

In general, the various embodiments of the UE 20 can include, but are not limited to personal portable digital devices having wireless communication capabilities, including but not limited to cellular telephones, navigation devices, laptop/palmtop/tablet computers, digital cameras and music devices, and Internet appliances.

Various embodiments of the computer readable MEMs 20B, 22B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 20A, 22A include but are not limited to general purpose computers, special purpose computers, microprocessors, digital signal processors (DSPs) and multi-core processors.

Various modifications and adaptations to the foregoing exemplary embodiments of this invention may become apparent to those skilled in the relevant arts in view of the foregoing description. While the exemplary embodiments have been described above in the context of the LTE and LTE-A system, as noted above the exemplary embodiments of this invention may be used with various other types of wireless communication systems.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

What is claimed is:

1. An apparatus comprising
   at least one memory storing computer program code; and
   at least one processor upon executing the computer program code performs the following:
   reporting to a wireless network node channel quality that is specific for a user equipment; and
   searching for a downlink control channel directed to the user equipment within a search space signaled from the wireless network node, in which a size of the search space is allocated for the user equipment based at least in part on the reported channel quality, and in which a width of the search space selects between a first type and a second type of the downlink control channel.

2. The apparatus according to claim 1, in which the channel quality comprises a channel quality index and the wireless network node comprises an eNodeB of an evolved universal terrestrial radio access network system; and
   in which the search space is defined by downlink signaling received from the eNodeB between when the channel quality is reported and when the search for the downlink control channel is initiated.

3. The apparatus according to claim 1, in which the first type of downlink control channel comprises a physical downlink control channel which corresponds to poorer reported channel quality, and the second type of downlink control channel comprises an enhanced physical downlink control channel which corresponds to better channel quality.

4. The apparatus according to claim 1, in which progressively narrower search spaces correspond to progressively better values for the channel quality.

5. The apparatus according to claim 1, in which the apparatus is embodied in the user equipment.

6. A method, comprising:
   reporting to a wireless network node channel quality that is specific for a user equipment; and
   searching for a downlink control channel directed to the user equipment within a search space signaled from the wireless network node, in which a size of the search space is allocated for the user equipment based at least in part on the reported channel quality, and in which a width of the search space selects between a first type and a second type of the downlink control channel.

7. The method according to claim 6, in which the channel quality comprises a channel quality index and the wireless network node comprises an eNodeB of an evolved universal terrestrial radio access network system; and in which the search space is defined by downlink signaling received from the eNodeB between when the channel quality is reported and when the search for the downlink control channel is initiated.

8. A non-transitory computer readable memory tangibly storing a computer program, the computer program executed by at least one processor, to perform:
reporting to a wireless network node channel quality that is specific for a user equipment; and
searching for a downlink control channel directed to the user equipment within a search space signaled from the wireless network node, in which a size of the search space is allocated for the user equipment based at least in part on the reported channel quality, and in which a width of the search space selects between a first type and a second type of the downlink control channel.

9. The non-transitory computer readable memory according to claim 8, in which the search space is defined by downlink signaling received from the eNodeB between when the channel quality is reported and when the search for the downlink control channel is initiated.

10. An apparatus comprising
at least one memory storing computer program code; and
at least one processor upon executing the computer program code performs the following:
determining a search space comprising determining a size of the search space based at least in part from channel quality reported by a user equipment; and
sending to the user equipment within the determined search space a downlink control channel directed to the user equipment, in which a width of the search space selects between a first type and a second type of the downlink control channel.

11. The apparatus according to claim 10, in which the channel quality comprises a channel quality index which is received from the user equipment in an evolved universal terrestrial radio access network system;
and in which the computer program code is executed by the at least one processor to perform at least sending downlink signaling to the user equipment informing of the determined search space, prior to sending the downlink control channel.

12. The apparatus according to claim 10, in which the first type of downlink control channel comprises a physical downlink control channel which corresponds to poorer channel quality reported by the user equipment, and the second type of downlink control channel comprises an enhanced physical downlink control channel which corresponds to better channel quality reported by the user equipment.

13. The apparatus according to claim 10, in which progressively narrower search spaces are determined from progressively better values for the channel quality.

14. The apparatus according to claim 10, in which the apparatus comprises a network access node.

15. A method comprising:
determining a search space comprising determining a size of the search space based at least in part from channel quality reported by a user equipment; and
sending to the user equipment within the determined search space a downlink control channel directed to the user equipment, in which a width of the search space selects between a first type and a second type of the downlink control channel.

16. The method according to claim 15, in which the channel quality comprises a channel quality index which is received from the user equipment in an evolved universal terrestrial radio access network system;
and the method further comprises sending downlink signaling to the user equipment informing of the determined search space, prior to sending the downlink control channel.

17. The method according to claim 15, in which progressively narrower search spaces are determined from progressively better values for the channel quality.

18. A non-transitory computer readable memory tangibly storing a computer program, the computer program executed by at least one processor to perform:
determining a search space comprising determining a size of the search space based at least in part from channel quality reported by a user equipment; and
sending to the user equipment within the determined search space a downlink control channel directed to the user equipment, in which a width of the search space selects between a first type and a second type of downlink control channel.

* * * * *